United States Patent
Vemuri et al.

(10) Patent No.: US 10,191,948 B2
(45) Date of Patent: Jan. 29, 2019

(54) JOINS AND AGGREGATIONS ON MASSIVE GRAPHS USING LARGE-SCALE GRAPH PROCESSING

(71) Applicant: Microsoft Technology Licensing, LLC, Redmond, WA (US)

(72) Inventors: Srinivas S. Vemuri, Santa Clara, CA (US); Wenlei Xie, Ithaca, NY (US); Suvodeep Pyne, Mountain View, CA (US); Vinitha Reddy Gankidi, Sunnyvale, CA (US); Maneesh Varshney, San Jose, CA (US); Mitul Tiwari, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 15/056,996

(22) Filed: Feb. 29, 2016

(65) Prior Publication Data
US 2016/0253389 A1    Sep. 1, 2016

Related U.S. Application Data

(60) Provisional application No. 62/126,199, filed on Feb. 27, 2015.

(51) Int. Cl.
*G06F 17/30* (2006.01)

(52) U.S. Cl.
CPC .. *G06F 17/30486* (2013.01); *G06F 17/30498* (2013.01); *G06F 17/30958* (2013.01)

(58) Field of Classification Search
CPC ......... G06F 17/30486; G06F 17/30958; G06F 17/30498

(Continued)

(56) References Cited

U.S. PATENT DOCUMENTS 6,169,989 B1 * 1/2001 Eichstaedt ........ G06F 17/30867
8,671,353 B1 * 3/2014 Varadarajan ....... G06Q 30/0201
715/763

(Continued)

FOREIGN PATENT DOCUMENTS

CN    103870471 A *  6/2014  ....... G06F 17/30864

OTHER PUBLICATIONS

"Apache Giraph", [Online]. Retrieved from the Internet: <URL: graph.apache.org., (Aug. 31, 2015), 1 pg.

(Continued)

*Primary Examiner* — Phuong Thao Cao
(74) *Attorney, Agent, or Firm* — Schwegman Lundberg & Woessner, P.A.

(57) ABSTRACT

This disclosure is directed to large-scale graph processing to determine second-degree connections for members of a social network. A social graph is duplicated into two graphs, where each of the two graphs are partitioned into various partitions. The partitions are each sorted according to a predetermined key selected from each of the graphs. The partitions are then assigned logical Work Units, where a first set of Work Units are determined from a first graph and second set of Work Units are determined from a second graph. The Work Units are determined to be asymmetrical such that the partitions of the first set of Work Units are assigned differently than the partitions of the second set of Work Units. One set of Work Units are loaded in-memory and another set of Work Units are streamed to a mapping module process, which determines the second-degree connections from the sets of Work Units.

20 Claims, 9 Drawing Sheets

(58) Field of Classification Search
USPC .......................................................... 707/736
See application file for complete search history.

(56) References Cited

U.S. PATENT DOCUMENTS

| | | | |
|---|---|---|---|
| 8,935,257 B1 | 1/2015 | Vemuri et al. | |
| 9,836,517 B2* | 12/2017 | Presta ................ | G06F 17/30584 |
| 10,025,859 B2* | 7/2018 | Lin .................... | G06F 17/30864 |
| 2004/0068331 A1* | 4/2004 | Cronquist ........... | G06F 17/5045 |
| | | | 700/18 |
| 2009/0204582 A1* | 8/2009 | Grandhi .............. | G06F 17/3087 |
| 2010/0030793 A1* | 2/2010 | Cooper ............... | G06F 17/30339 |
| | | | 707/602 |
| 2011/0016354 A1* | 1/2011 | Douros ............... | G06F 11/1438 |
| | | | 714/16 |
| 2011/0078652 A1* | 3/2011 | Mani .................. | G06F 8/10 |
| | | | 717/105 |
| 2012/0005238 A1* | 1/2012 | Jebara ................ | G06Q 10/04 |
| | | | 707/798 |
| 2012/0066206 A1* | 3/2012 | Chappell ............ | G06F 17/30445 |
| | | | 707/713 |
| 2012/0143866 A1* | 6/2012 | Mameri ............... | G06F 9/445 |
| | | | 707/737 |
| 2012/0246158 A1* | 9/2012 | Ke ..................... | G06F 17/30463 |
| | | | 707/736 |
| 2012/0310916 A1* | 12/2012 | Abadi ................ | G06F 17/30445 |
| | | | 707/713 |
| 2013/0013585 A1* | 1/2013 | Graefe ............... | G06F 17/30498 |
| | | | 707/714 |
| 2013/0191416 A1* | 7/2013 | Lee .................... | G06F 17/30979 |
| | | | 707/771 |
| 2014/0067931 A1* | 3/2014 | Harik ................. | H04L 67/306 |
| | | | 709/204 |
| 2014/0280044 A1* | 9/2014 | Huynh ............... | G06F 17/30477 |
| | | | 707/722 |
| 2014/0320497 A1* | 10/2014 | Vojnovic ............ | G06T 11/206 |
| | | | 345/440 |
| 2015/0006316 A1* | 1/2015 | Zhou .................. | G06Q 10/04 |
| | | | 705/26.7 |
| 2015/0026120 A1* | 1/2015 | Chrapko ............. | G06Q 50/01 |
| | | | 707/609 |
| 2015/0074044 A1* | 3/2015 | Metreveli ........... | G06F 17/30958 |
| | | | 707/609 |
| 2015/0100661 A1* | 4/2015 | Heise ................. | H04L 47/125 |
| | | | 709/213 |
| 2015/0350324 A1* | 12/2015 | Hu ..................... | G06F 17/30867 |
| | | | 709/219 |
| 2016/0034463 A1* | 2/2016 | Brewer .............. | H04L 43/12 |
| | | | 707/734 |
| 2016/0125093 A1* | 5/2016 | Cho ................... | G06F 17/30958 |
| | | | 707/798 |
| 2016/0253389 A1* | 9/2016 | Vemuri, Sr. ........ | G06F 17/30486 |
| | | | 707/736 |
| 2016/0253402 A1* | 9/2016 | Klots ................ | G06F 17/30584 |
| | | | 707/634 |
| 2017/0078481 A1* | 3/2017 | Yao ................... | H04M 3/42042 |

OTHER PUBLICATIONS

"FAUNUS: Graph Analytics Engine", [Online]. Retrieved from the Internet: <URL: http://thinkaurelius.github.io/faunus/, (Accessed Feb. 17, 2016), 2 pgs.

"Friendster Social Network Dataset: Friends", Archiveteam, (Jul. 4, 2011), 4 pgs.

"Infinitegraph: The distributed graph database.", Objectivity, [Online]. Retrieved from the Internet: <URL: http://www.infinitegraph.com/, (Accessed Mar. 3, 2016), 4 pgs.

"Linkedin Hadoop cluster", https://web.archive.org/web/20150215042143/http://data.linkedin.com/projects/hadoop, (Accessed Mar. 4, 2016), 2 pgs.

"Neo4j: Nosql for the enterprise.", [Online]. Retrieved from the Internet: <URL: http://neo4j.org/., (Accessed Mar. 3, 2016), 5 pgs.

"Netflix Curator", [Online]. Retrieved from the Internet: <URL: https://github.com/netflix/curator, (2016), 2 pgs.

"The Hadoop Distributed File System: Architecture and Design", [Online]. Retrieved from the Internet: <URL: http://hadoop.apactie.org/docs/r0.18.0/hdfs_design.pdf, (2007), 14 pgs.

"Welcome to Cubert!", Linkedin Cubed Team, [Online]. Retrieved from the Internet: <URL: http://linkedin.github.io/Cubert/, (2014), 1 pg.

Dewitt, David J., et al., "Practical Skew handling in parallel Joins", VLDB, (1992), 27-40.

Gonzalez, J.E., "Graphx: Graph processing in a distributed dataflow framework", (2014), 15 pgs.

Gonzalez, J.E et al., "PowerGraph: Distributed graph-parallel computation on natural graphs.", (2012), 155 pgs.

Huang, J., et al., "Scalable SPARQL Querying of Large RDF Graphs", PVLDB, 4(11),, (2011), 12 pgs.

Malewicz, Grzegorz, et al., "Pregel: a system for large-scale graph processing", Proceedings of the 2010 ACM SIGMOD International Conference on Management of Data (SIGMOD '10), (2010), 135-146.

Shao, Bin, et al., "Trinity: A Distributed Graph Engine on a Memory Cloud", SIGMOD, (Jun. 2013), 12 pgs.

Varshney, Maneesh, et al., "Open Sourcing Cubert: A High Performance Computation Engine for Complex Big Data Analytics", [Online]. Retrieved from the Internet: <URL: https://engineering.linkedin.com/big-data/open-sourcingcubert-high-performance-computation-engine-complex-bigdata-analytics, (Nov. 1, 2014), 6 pgs.

Vemuri, Srinivas, et al,, "Execution primitives for scalable joins and aggregations in Map Reduce", (2014), 1462-1473.

Zaharia, M., et al., "Resilient Distributed Datasets: A Fault-Tolerant Abstraction for In-Memory Cluster Computing", (2012), 14 pgs.

\* cited by examiner

JOINS AND AGGREGATIONS ON MASSIVE GRAPHS USING LARGE-SCALE GRAPH PROCESSING

CROSS-REFERENCE TO RELATED APPLICATIONS

This application claims the benefit of priority to U.S. Pat. App. No. 62/126,199, filed Feb. 27, 2015 and titled "LARGE-SCALE GRAPH PROCESSING," the disclosure of which is hereby incorporated by reference in its entirety.

TECHNICAL FIELD

The subject matter disclosed herein generally relates to large-scale graph processing and, more particularly, to determining a triangle closing solution using large-scale graph processing that involves enumerating second-degree neighbors for every vertex in a graph and determining a shared connection count between the second-degree connections.

BACKGROUND

Online social networking services provide users with a mechanism for defining, and memorializing in a digital format, their relationships with other people. This digital representation of real-world relationships is frequently referred to as a social graph. Many social networking services utilize a social graph to facilitate electronic communications and the sharing of information between its users or members. For instance, the relationship between two members of a social networking service, as defined in the social graph of the social networking service, may determine the access and sharing privileges that exist between the two members. As such, the social graph in use by a social networking service may determine the manner in which two members of the social networking service can interact with one another via the various communication and sharing mechanisms supported by the social networking service.

One of the challenges in maintaining social graphs is understanding the relationships and connections developed by members of the social networking service. In particular, exploring and enumerating relationships within member-to-member social graphs often poses sizeable computational problems. One such computational problem is enumerating relationships among members that are connected by two degrees (i.e., at least one intervening member that is common to a first member and a second member). In social networking, members are said to be first-degree connections when the members are directly connected without any intervening connections (e.g., a direct connection between Alice and Bob). Two members are said to be second-degree connections when there is at least one intervening connection between such members (e.g., Alice and Bob are directly connected; Bob and Charles are directly connected; Alice and Charles are thus second-degree connections).

As social graphs represent members as nodes and connections as edges, exploring social graphs is often performed using graph processing techniques. For example, there are two typical approaches to enumerating second-degree connections within a social graph. The first involves treating the enumeration as a "join" problem and using traditional join processing approaches However, this first approach is vulnerable to skew. The second approach involves partitioning the social graph along its vertices, and then sorting the edges within each partition by its corresponding source vertex (e.g., source node). For each source vertex, and for every pair of neighbors $[n_i, n_j]$ in its list of first degree connections, this approach involves generating $[n_i, n, n_j]$ as a candidate second-degree "hop". Under these two approaches, once the second-degree connections have been enumerated, performing the GROUP BY operation involves shuffling the edges or repartitioning the social graphs, which is typically a very resource and computationally heavy step.

BRIEF DESCRIPTION OF THE DRAWINGS

Some embodiments are illustrated by way of example and not limitation in the figures of the accompanying drawings.

DETAILED DESCRIPTION

Examples systems and methods are directed to a social networking server that identifies second-degree connections for member nodes of a given social graph. This disclosure contemplates this problem as a triangle closing computation that involves enumerating second-degree neighbors for every node (e.g., a member) in the social graph; and computing a shared connection count between the second-degree connections, which counts the number of graph nodes which are in the first-degree neighborhood of both the given member and the second-degree neighbor. Computing the second-degree neighbors followed by a shared connection count involves enumerating all possible second-degree connection edges followed by an aggregation (or GROUP BY).

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
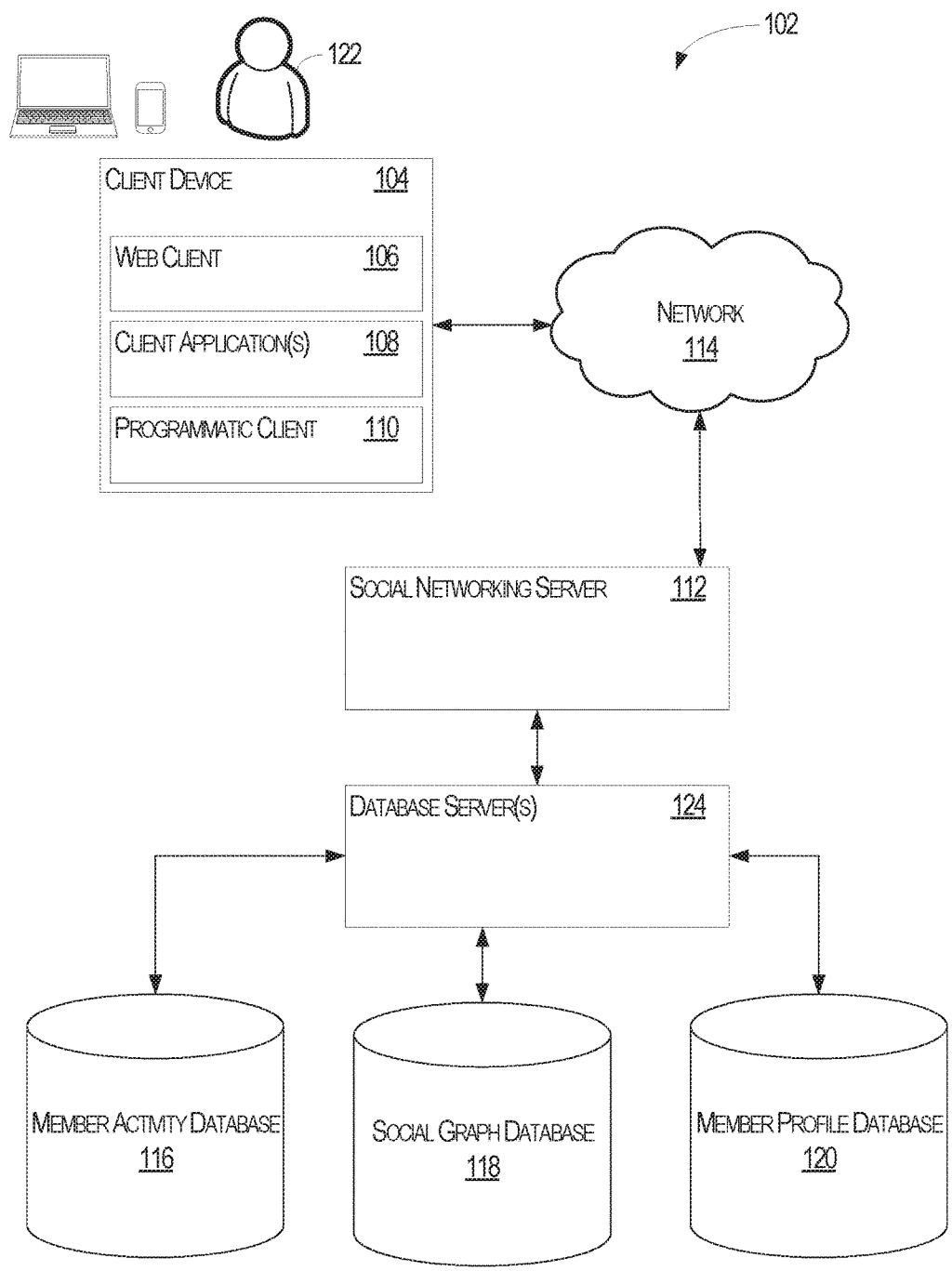
FIG. 1 is a block diagram of a system, in accordance with an example embodiment, for providing a social networking service.

With reference to FIG. 1, an example embodiment of a high-level client-server-based network architecture 102 is shown. A social networking server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on client device 104. The social networking server 112 is further communicatively coupled with one or more database servers 124 that provide access to one or more databases 116-120.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronics, or any other communication device that a user 122 may utilize to access the social networking server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones. Global Positioning System (GPS) devices, and so forth. The client device 104 may be a device of a user 122 that is used to perform one or more searches for user profiles accessible to, or maintained by, the social networking server 112.

In one embodiment, the social network server 112 is a network-based appliance that responds to initialization requests or search queries from the client device 104. One or more users 122 may be a person, a machine, or other means of interacting with client device 104. In various embodiments, the user 122 is not part of the network architecture 102, but may interact with the network architecture 102 via the client device 104 or another means. For example, one or more portions of network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 122, to identify or locate other connected members, etc.). Conversely, if the social networking server access client is not included in the client device 104, the client device 104 may use its web browser to access the initialization and/or search functionalities of the social networking server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the network architecture 102 via the network 114. In this instance, the social networking server 112, in response to receiving the input from the user 122, communicates information to the client device 104 via the network 114 to be presented to the user 122. In this way, the user 122 can interact with the social networking server 112 using the client device 104.

Further, while the client-server-based network architecture 102 shown in FIG. 1 employs a client-server architecture, the present subject matter is, of course, not limited to such an architecture, and could equally well find application in a distributed, or peer-to-peer, architecture system, for example.

In addition to the client device 104, the social networking server 112 communicates with other one or more database server(s) 124 and/or database(s) 116-120. In one embodiment, the social networking server 112 is communicatively coupled to a member activity database 116, a social graph database 118, and a member profile database 120. The databases 116-120 may be implemented as one or more types of databases including, but not limited to, a hierarchical database, a relational database, an object-oriented database, a graph database, one or more flat files, or combinations thereof. Examples of graph databases include, but are not limited to, Neo4j, which is available from Neo Technology. Inc., Giraph, which is available from The Apache Software Foundation, and GraphLab, which is available from Dato, Inc.

The member profile database 120 stores member profile information about members who have registered with the social networking server 112. Consistent with some embodiments, when a person initially registers to become a member of the social networking service provided by the social networking server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120.

Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

For members associated with an organization, the member profile database 120 may include an identification as to whether a given member is authorized to act on the organization's behalf. Thus, the authorized member may disseminate information, endorsed by the organization, to other members of the social networking service. In this manner, an organization may inform other members of the social networking service, individuals and organizations, of news and/or events that may be relevant to the organization. For example, the organization may disseminate information about a new product, an industry event, a news item, or other information to other members of the social networking service. The organization may also disseminate such information to members of the social networking service that have elected to "follow" the organization or have elected to subscribe to information provided by the organization.

Members of the social networking service provided by the social networking server 112 may establish connections with one or more members and/or organizations of the social networking service. The connections may be defined as a social graph, where the member and/or organization is representative by a node in the social graph and the edges identify connections between nodes. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the nodes representing the members; otherwise, members are said to be "nth"-degree connections where "n" is defined as the number of edges separating two nodes. As an example, two members are said to be "2nd-degree" connections where each of the members share a connection in common, but are not directly connected to one another. In one embodiment, the social graph maintained by the social networking server 112 is stored in the social graph database 118. Although the foregoing discussion refers to "social graph" in the singular, one of ordinary skill in the art will recognize that the social graph database 118 may be configured to store multiple social graphs.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

In one embodiment, the social networking server 112 communicates with the various databases 116-120 through one or more database server(s) 124. In this regard, the database server(s) 124 provide one or more interfaces and/or services for providing content to, modifying content, removing content from, or otherwise interacting with the databases 116-120. For example, and without limitation, such interfaces and/or services may include one or more application programming interfaces (APIs), one or more services provided via a service-oriented architecture (SOA), one or more services provided via a REST-oriented architecture (ROA), or combinations thereof. In an alternative embodiment, the social networking server 112 communicates with the databases 116-120 and includes a database client, engine, and/or module, for providing data to, modifying data stored within, and/or retrieving data from, the one or more databases 116-120.

One of ordinary skill in the art will recognize that the database server(s) 124 may include one or more different types of servers. For example, the database server(s) 124 may include a Microsoft® Exchange Server, a Microsoft® Sharepoint® Server, a Lightweight Directory Access Protocol (LDAP) server, any other server configured to provide user profile information, or combinations thereof. Accordingly, and in one embodiment, the servers in communication with the social networking server 112 are configured to access the various databases 116-120 and retrieve or store corresponding information.

Figure 2:
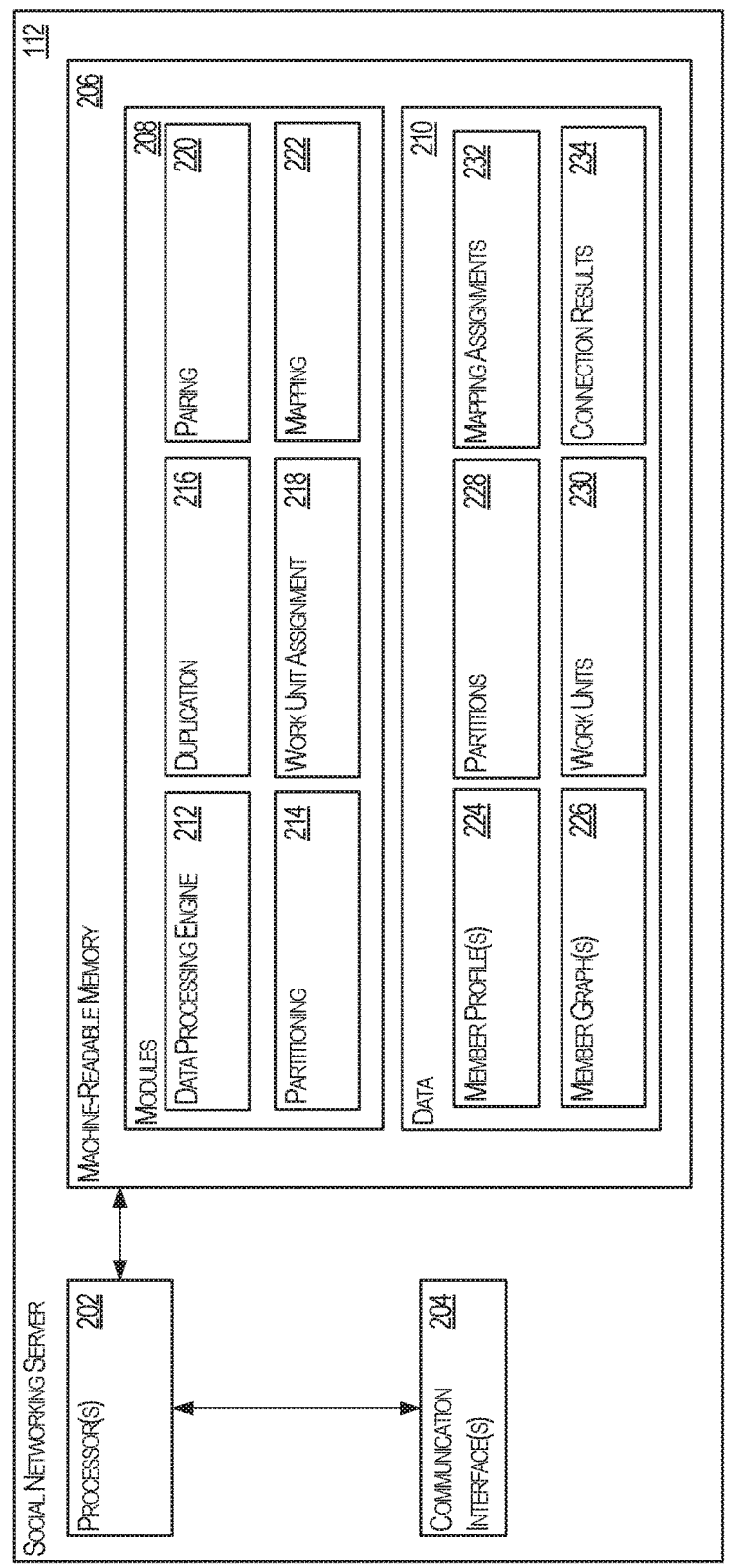
FIG. 2 is a block diagram illustrating the social networking server shown in FIG. 1, in accordance with an example embodiment.

FIG. 2 illustrates the social networking server 112 of FIG. 1, in accordance with an example embodiment. In one embodiment, the social networking server 112 includes one or more processor(s) 202, one or more communication interface(s) 204, and a machine-readable memory 206 that stores computer-executable instructions for one or more application(s) 208 and data 210 used to support one or more functionalities of the applications 208.

The various functional components of the social networking server 112 may reside on a single device or may be distributed across several computers in various arrangements. The various components of the social networking server 112 may, furthermore, access one or more databases (e.g., databases 116-120 or any of data 210), and each of the various components of the social networking server 112 may be in communication with one another. Further, while the components of FIG. 2 are discussed in the singular sense, it will be appreciated that, in other embodiments, multiple instances of the components may be employed.

The one or more processors 202 may be any type of commercially available processor, such as processors available from the Intel Corporation, Advanced Micro Devices, Texas Instruments, or other such processors. Further still, the one or more processors 202 may include one or more special-purpose processors, such as a field-programmable gate array (FPGA) or an application specific integrated circuit (ASIC). The one or more processors 202 may also include programmable logic or circuitry that is temporarily configured by software to perform certain operations. Thus, once configured by such software, the one or more processors 202 become specific machines (or specific components of a machine) uniquely tailored to perform the configured functions and are no longer general-purpose processors 202.

The one or more communication interfaces 204 are configured to facilitate communications between the social networking server 112, the client device 104, and one or more of the database server(s) 124 and/or database(s) 116-120. The one or more communication interfaces 204 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable memory 206 includes various modules 208 and data 210 for implementing the social networking server 112. The machine-readable memory 206 includes one or more devices configured to store instructions and data 210 temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable memory" should be taken to include a single medium or multiple media (e.g., a centralized or distributed database, or associated caches and servers) able to store the modules 208 and the data 210. Accordingly, the machine-readable memory 206 may be implemented as a single storage apparatus or device, or, alternatively and/or additionally, as a "cloud-based" storage systems or storage networks that include multiple storage apparatus or devices. As shown in FIG. 2, the machine-readable memory 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the social networking server 112 include, but are not limited to, a data processing engine 212, a partitioning module 214, a duplication module 216, a Work Unit assignment module 218, a pairing module 220, and a mapping module 222. The data 210 supporting these applications 208 include, but are not limited to, selected member profile(s) 224, one or more member graph(s) 226, partitions 228 of the one or more member graph(s) 226, Work Units 230 of the partitions 228, mapping assignments 232 for pairing the various Work Units 230 to corresponding mappers, and connection results 234 that include the second-degree connections for the selected member profile(s) 224.

The data processing engine 212 is configured to process data retrieved from one or more of the databases 116-122. In addition, the data processing engine 212 provides a platform in which one or more of the other modules 208 are instantiated, such as the partitioning module 214, the duplication module 216, the Work Unit assignment module 218, the pairing module 220, and the mapping module 222. In one embodiment, the data processing engine 212 is implemented as Apache™ Hadoop®, which is available from the Apache Software Foundation. Further still the data processing engine 212 is configured to implement the Cubert framework, which is an Open Source large-scale data processing framework provided by LinkedIn, Inc.

In one embodiment, the data processing engine 212 is configured to retrieve data from one or more of the databases 116-122 including, but not limited to, one or more social graphs from the social graph database 118 and/or one or more member profiles 224 from the member profile database 120. Member profile information retrieved from the member profile database 120 is stored as the member profile(s) 224, and the social graphs associated with the retrieved member profile(s) are stored as the member graph(s) 226. In one embodiment, the retrieved social graphs correspond to the retrieved member profiles. In another embodiment, the data processing engine 212 retrieves a social graph that includes a predetermined number of member profile 224. For example, the data processing engine 212 may retrieve or obtain a social graph that includes all of the retrieved member profiles 224, where the retrieved or obtained social graph includes the retrieved member profiles as nodes within the social graph and connections between the member profiles as edges within the social graph.

The partitioning module 214 is configured to the retrieved member graph(s) 226. In one embodiment, partitioning module 214 is configured to partition the one or more member graph(s) 226 into size-bound chunks (e.g., partitions). As discussed below, subsequent relational style operators are applied on these chunks leveraging the data layout to achieve significant acceleration in operator execution. The partitions of the one or more member graph(s) 226 are stored as the partitions 228.

As known to one of ordinary skill in the art, the data processing engine 212 and/or the partitioning module 214 leverages the building blocks in Cubert (e.g., the data processing engine 212) to partition the one or more member graph(s) 226. In one embodiment, the partitions 228 are created via an underlying primitive, referred to as BLOCKGEN, which accepts as input one or more partition key columns, one or more sort key columns and a size constraint. In this manner, the partitions 228 of the member graph(s) 226 are created from the BLOCKGEN primitive. Furthermore, the partitions 228 may be constrained to be of a size that ensures that a single physical block is guaranteed to be memory resident. Additional details regarding the BLOCKGEN primitive and the partitioning of the one or more member graph(s) 226 can be found in U.S. Pat. No. 8,935,257, titled "ORGANIZING, JOINING, AND PERFORMING STATISTICAL CALCULATIONS ON MASSIVE SETS OF DATA," the disclosure of which is incorporated by reference in its entirety.

Furthermore, the data processing engine 212 supports an operation, called "Blockgen_By_Index," that can be used to consistently partition and/or co-partition a second data set so that there is a one-to-one mapping of the partitions in the second data set to partitions of the original data set, and the partitions contain the same non-overlapping sets of partition keys.

Using the partitions 228 as the underlying mechanism, the data processing engine 212 can execute one or more calculations and relational operators efficiently. In particular, when the data processing engine 212 processes aggregations right after a JOIN, the processing engine 212 leverages the sort order to implement a technique, called MESH JOIN, that has a property whereby an aggregation operator (e.g., AVG( ), COUNT( ), MAX( ), SUM( ), etc.) inserted on the map side is guaranteed to see its input presented to it in sorted order of the GROUP BY key. This property has the technical benefit of scaling the computation because: (1) the memory used for the aggregation is essentially constant (e.g., for the single current aggregation key) as the input comes in sort order of the aggregation key; and, (2) the partial result computed on any given site (e.g., mapper) is a complete result for the subset of rows seen on the mapper as all inputs for a given aggregation key are seen contiguously and without breaks. Thus, the data shuffled between the map and the reduce phases is the intermediate result corresponding to the partial aggregates. In other words, this process minimizes the amount of data shuffled. "minimized the amount of data shuffled." In one embodiment, the data processing engine 212 is further configured (via one or more of the modules 214-222) to perform multiple JOIN operations (e.g., one or more nested loops of JOIN operations) for every pair of aggregation keys generated from the two partitions.

Based on the foregoing operations, the disclosed systems and methods leverage a query that has a JOIN followed by a GROUP BY, for which a data layout was created that ensured that the output of the JOIN and input to the GROUP BY was in a form that maximized the potential for partial aggregation at a site and, in turn, minimized the number of records shuffled.

Figure 3:
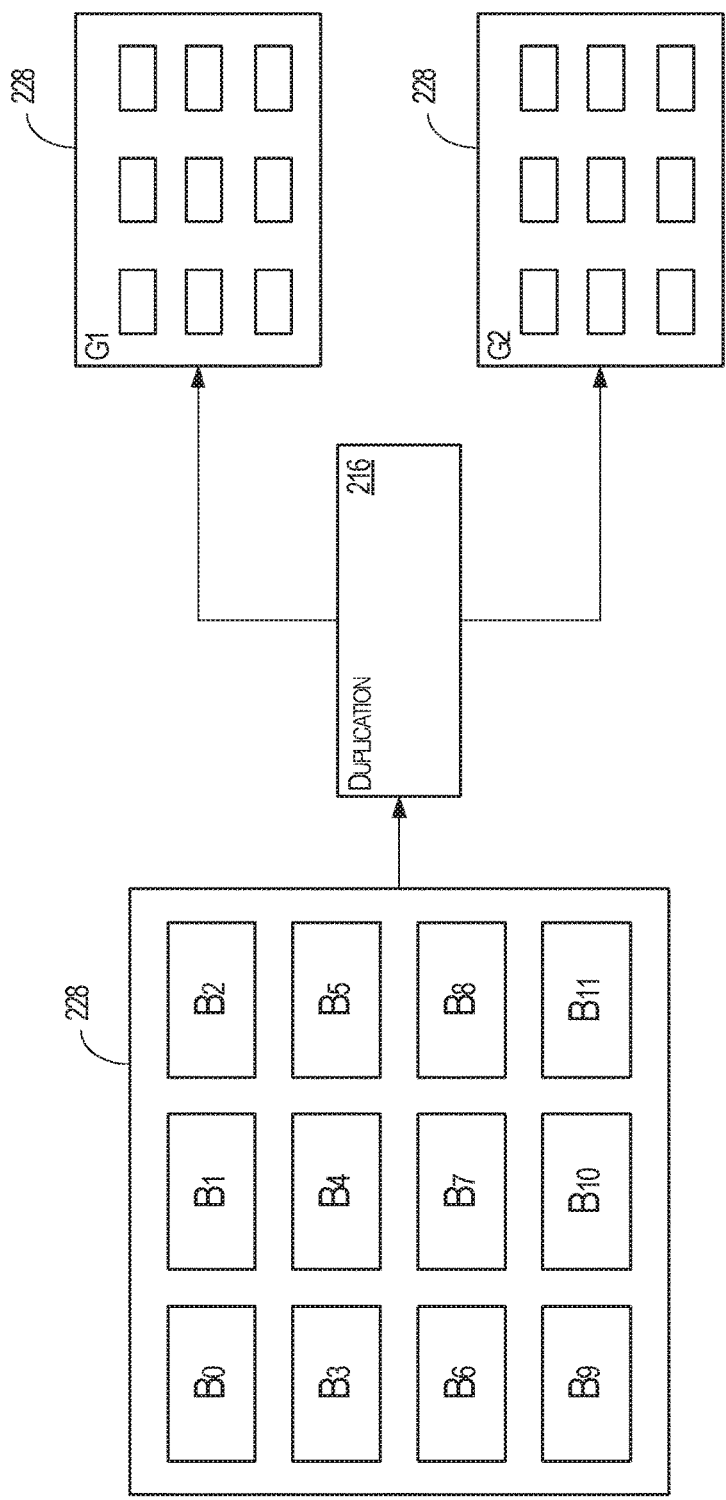
FIG. 3 is a block diagram illustrating duplicating member graph partitions, in accordance with an example embodiment.

The duplication module 216 is configured to duplicate the partitions 228 created by the partitioning module 214. FIG. 3 is a block diagram illustrating duplicating the partitions 228, in accordance with an example embodiment. As shown in FIG. 3, the duplication module 216 accepts as input a plurality of partitions 228, denoted as $B_0$-$B_{11}$. The partitions 228 represent the original member graph associated with a corresponding member profile. The duplication module 216 then generates two additional sets of partitions 228. As used in this disclosure, each set of partitions 228 represent a member graph, denoted as G1 and G2. Furthermore, and in one embodiment, each partition 228 includes a source node and a destination node. Thus, G1.src denotes a source node selected from the graph G1, G1.dest denotes a destination node selected from the graph G1, G2.src denotes a source node selected from the graph G2, and G2.dest denotes a destination node selected from the graph G2. As discussed below, the data processing engine 212 determines the second-degree connections for one or more of the member profile(s) 224 by performing a "self-JOIN" on the member graph 226 for a given member profile, where the member graph 226 is duplicated into the graphs G1 and G2, such that G1.dest=G2.src.

One of the challenges in enumerating the second-degree connections for one or more the member profile(s) 224 through this self-JOIN, is that a shuffling problem can occur in the intermediate output of the JOIN between the partitions 228 of G1 and the partitions 228 of G2. More particularly, aggregating on G1.src, G2.dest typically requires a repartitioning step (in other words, a shuffle) of the intermediate output of the join. Since the volume of data is quite large, the shuffle would end up spending a lot of time and resources.

However, this disclosure contemplates addressing this shuffling problem if the JOIN output can be generated such that it is partitioned on (G1.src, G2.dest). In this context, assume G1 is partitioned into K1 partitions with G1.src as a first partition key and the graph G2 is partitioned into K2 partitions with G2.dest as a second partition key. In one embodiment, the partitioning module 214 creates partitions 228 within a predetermined size such that each partition 228 can be accommodated in the machine-readable memory of the mapping module 222 (e.g., one or more instances of the mapping module 222). The operations of the mapping module 222 are discussed further below with reference to FIGS. 5-7. The predetermined size may be dynamically determined as a percentage (or other value) of the amount of machine-readable memory of the social networking server 112 and/or as a function of the number of nodes within one or more of the graphs G1 and/or G2.

For efficiency of aggregation, and in one embodiment, the partitions 228 of G1 are sorted by G1.src and the partitions of G2 are sorted by G2.dest. In this manner, the partitions 228 are effectively an edge cut of the original member graph 226 (e.g., source nodes are split dis-jointly between the partitions 228 for G1 and destinations nodes are split dis-jointly between the partitions 228 for G2).

Under this framework, this disclosure presents the following example. Suppose the data processing engine 212 is provided with a data processing job of (K1*K2) mapping module 222 processes. Given a mapping module 222 process (i, j), where i∈[0, K1) and j∈[0, K2), partitions G1.i and G2.j are loaded and a map side JOIN is then executed. In this example, the mapping module 222 process represents the unique site that produces second-degree edges corresponding to the pairs [s, d] where s belongs to the set of source vertices contained in G1.i and d belongs to the set of destination vertices in G2.j. Thus the second-degree edges produced by this mapping module 222 process can be locally aggregated to compute the total number of paths for a pair [s, d] produced. The technical benefit from this approach is that the intermediate data produced by the JOIN does not need to be shuffled to the reduce phase and the enumerated connections can be computed entirely by this mapping module 222 process.

In general, a simple form of partitioning may take a symmetric approach and create an equal number of source and destination partitions, such as N partitions. However, this simple form implies that if a single mapping module 222 is assigned to process a pair of source and destination partitions, the total number of required mapper processes is N!. Given a typical upper limit of 10000 on the total number of mapping module 222 processes, it leads to a conservative upper bound of N to be less than or equal to 100. This implies that each partition is, at least, 1/100th of the original member graph 226. For a large graph, this number is still large enough that in-memory processing of the partition is either inefficient or infeasible. In this context, the term "in-memory" means that the partition is loaded within a volatile memory of the social networking server 112, such as RAM. However, in-memory could also refer to loading the partition in a memory designated as a cache or other similar memory designated for rapid retrieval and/or storage.

Accordingly, this disclosure provides an asymmetric partitioning scheme that allows, from a technical standpoint, at least one of the partitions 228 (from either G1 or G2) to be completely loadable in-memory. The asymmetric partitions 228 assigned to the mapping module 222 processes are referred to as "Work Units" and represent logical partitions of the original member graph 226.

In this manner, the work unit assignment module 218 is configured to assign partitions 228 to corresponding Work Units. In one embodiment, a Work Unit is a group of partitions 228 and defines a logical partition of the original graph, where the logical partition (e.g., the Work Unit) is a union of the partitions 228. The Work Unit also identifies a logical unit of work from either graph G1 or graph G2 that is assigned to a mapping module 222 process. In one embodiment, the partitions 228 are assigned in a round robin fashion to the Work Units 230.

Figure 4:
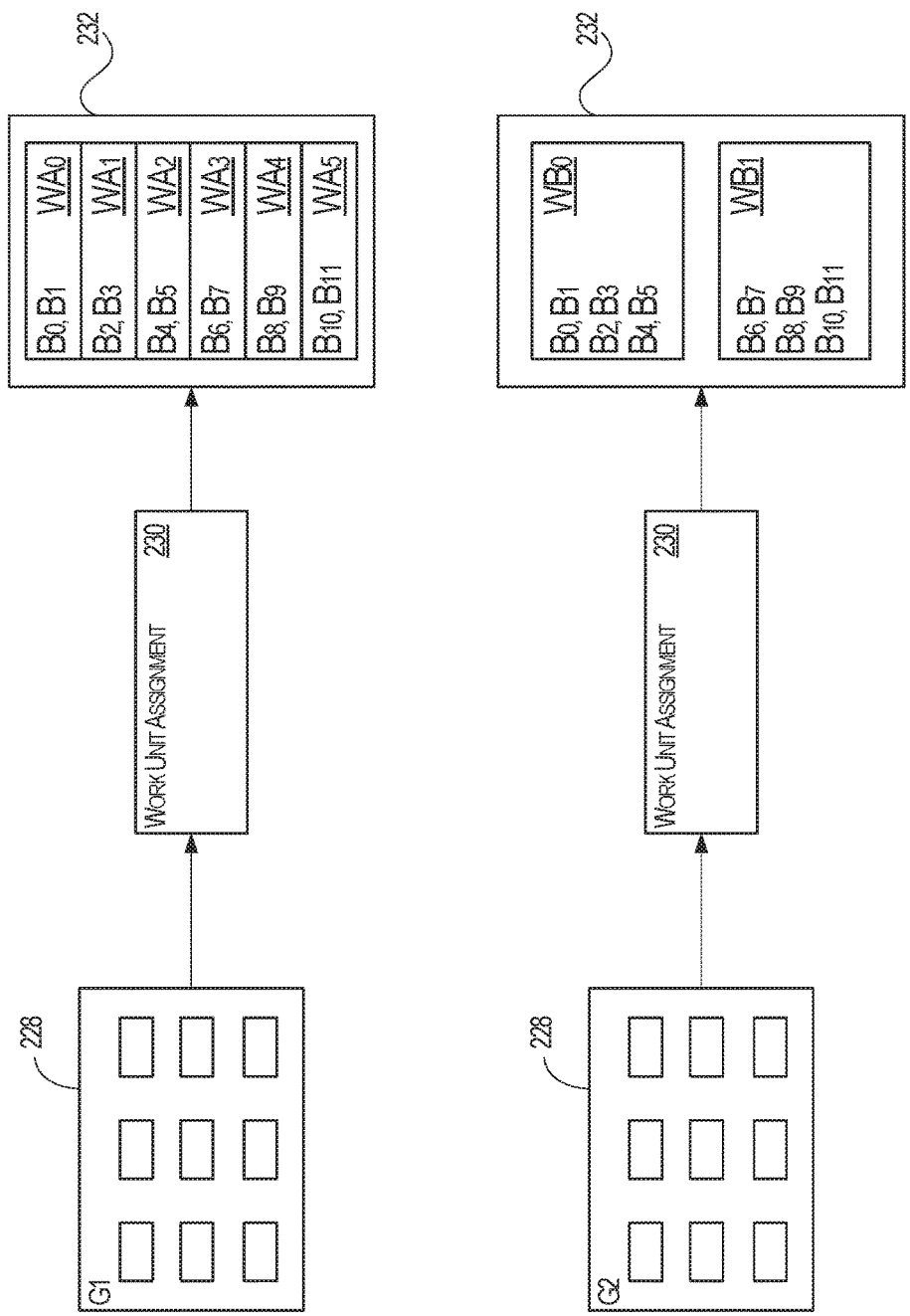
FIG. 4 is a block diagram illustrating assigning the duplicated member graph partitions of FIG. 3 to predetermined Work Units, in accordance with an example embodiment.

FIG. 4 is a block diagram illustrating assigning the duplicated member graph partitions 228 of FIG. 3 to pre-configured Work Units 230, in accordance with an example embodiment. In one embodiment, the Work Units 230 for G1 include $WA_0$-$WA_5$ and the Work Units 230 for G2 include $WB_0$ and $WB_1$. Further still, the number of partitions assigned to each Work Unit 230 may be preconfigured or configurable by an operator of the social networking server 112. For example, as shown in FIG. 4, each of the Work Units WA (e.g., the Work Units 230 for the source graph G1) are assigned two partitions, such that no one Work Unit 230 is assigned the same partition. In contrast, each of the Work Units WB (e.g., the Work Units 230 for the destination graph G2) are assigned six partitions, such that no one Work Unit 230 is assigned the same partition. In this manner, the number of Work Units 230 for the source graph G1 may be different than the number of Work Units 230 for the destination graph G2. As discussed below with reference to FIG. 7, the Work Units WB may be streamed to an assigned mapping module 222 process, whereas the Work Units WA may be loaded in-memory.

In one embodiment, the number of Work Units for WA and/or WB is such that the product of WA and WB (e.g., WA*WB) is around is around 3200 mapping module 222 processes. This product may represent an upper bound on the number mapping module 222 processes that the social networking server 112 may support. In addition, the number of Work Units WB is selected as the larger value of about 250, which implies that each Work Unit of WB is about ½50th the size of the original graph.

Although the product of 3200 is significantly smaller than the corresponding product produced via a symmetric partitioning, it is still large enough that is poses a technical problem for in-memory processing. By implementing a memory-efficient design of the main data structures used by a hash join algorithm, the data processing engine 212 ensures that the smaller (e.g., in size) Work Unit can be mapped to the build side of the hash join and tuples from the larger Work Unit can be iteratively joined with it in a streaming fashion.

Figure 5:
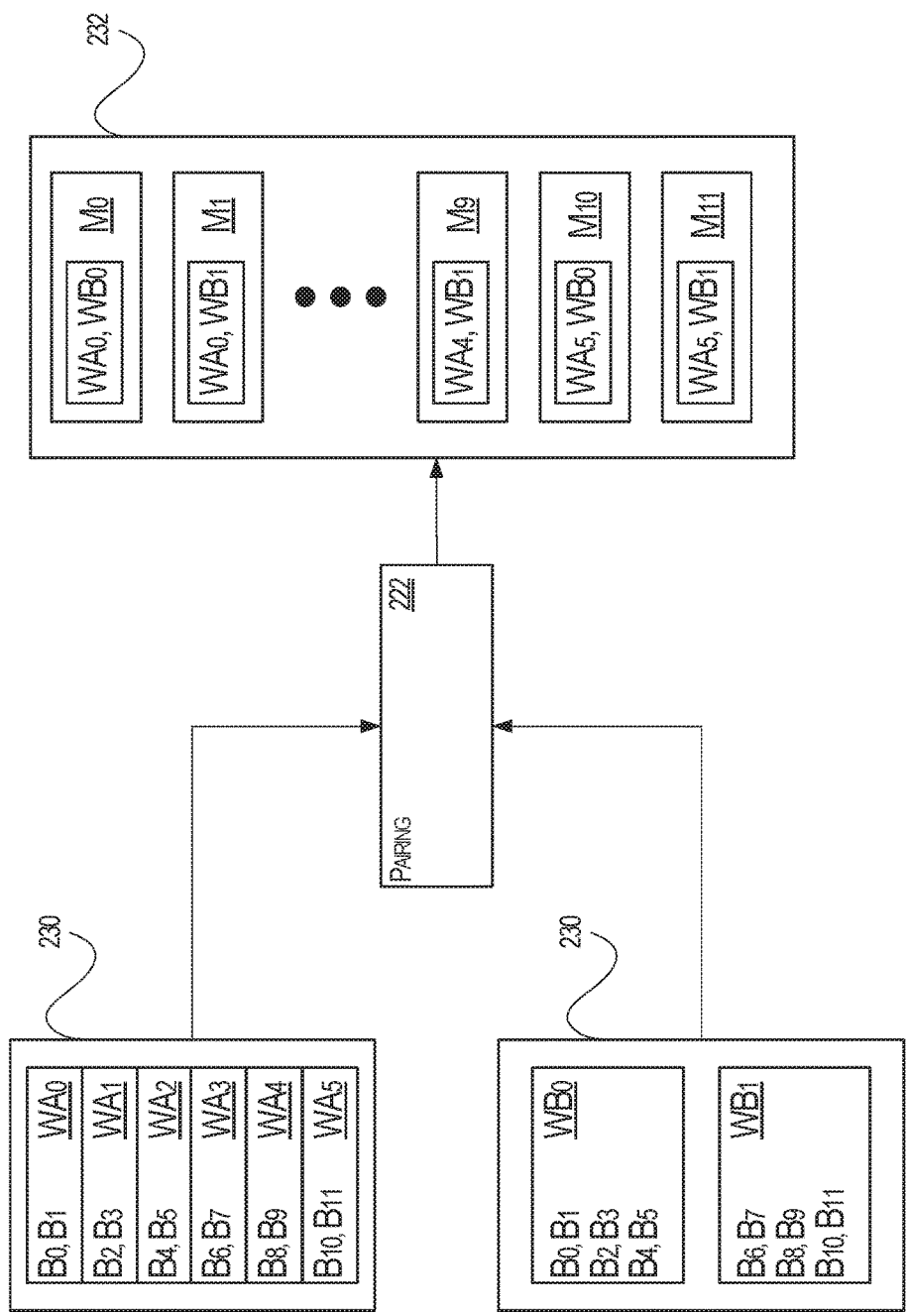
FIG. 5 is a block diagram illustrating assigning the Work Units of FIG. 4 to various mapping module processes for determining second-degree connections, in accordance with an example embodiment.

The pairing module 220 is configured to pair one or more Work Units 230 from the source graph G1 and the destination graph G2. In one embodiment, the pairing module 220 pairs (e.g., assigns) Work Units WA from the source graph G1 with Work Units WB from the destination graph G2. FIG. 5 is a block diagram illustrating assigning the Work Units 230 of FIG. 4 to various mapping module 222 processes for determining second-degree connections, in accordance with an example embodiment. The pairing module 220 may pair the Work Units 230 in such a way that each of the Work Units WA are paired with every one of the Work Units WB. More formally, the pairing module 222 determines the work load assignment for a given mapping module 222 process (i,j), where the mapping module 222 process is responsible for joining and aggregating the pair of Work Units G1.WorkUnit[i] and G2.WorkUnit[j]. Thus, the total number of mapping module 222 processes is W1*W2, where W1 is the number of Work Units of WA and W2 is the number of Work Units of WB.

If N were the total number of partitions 228 in the source graph G1 and the destination graph G2 (e.g., since they are of equal size), then the number of partitions 228 in a Work Unit WA of G1=N/W1 and the number of partitions 228 in a Work Unit WB of G2=N/W2. From this arrangement, one of ordinary skill in the art will appreciate that the values of W1 and W2 should be selected carefully, such that: 1) the product of W1 and W2 does not exceed the upper limit on the number of supported mapping module 222 processes; and 2) at least one of the Work Units assigned to each mapping module 222 process can be stored in-memory (e.g., or a large fraction of it can be held in memory), and joined in a streaming fashion with the partitions 228 from the other Work Unit. This process is further explained with reference to FIG. 7, discussed below. In one embodiment, the assignments and/or pairings of Work Units 230 is stored as the mapping assignments 232.

Figure 6:
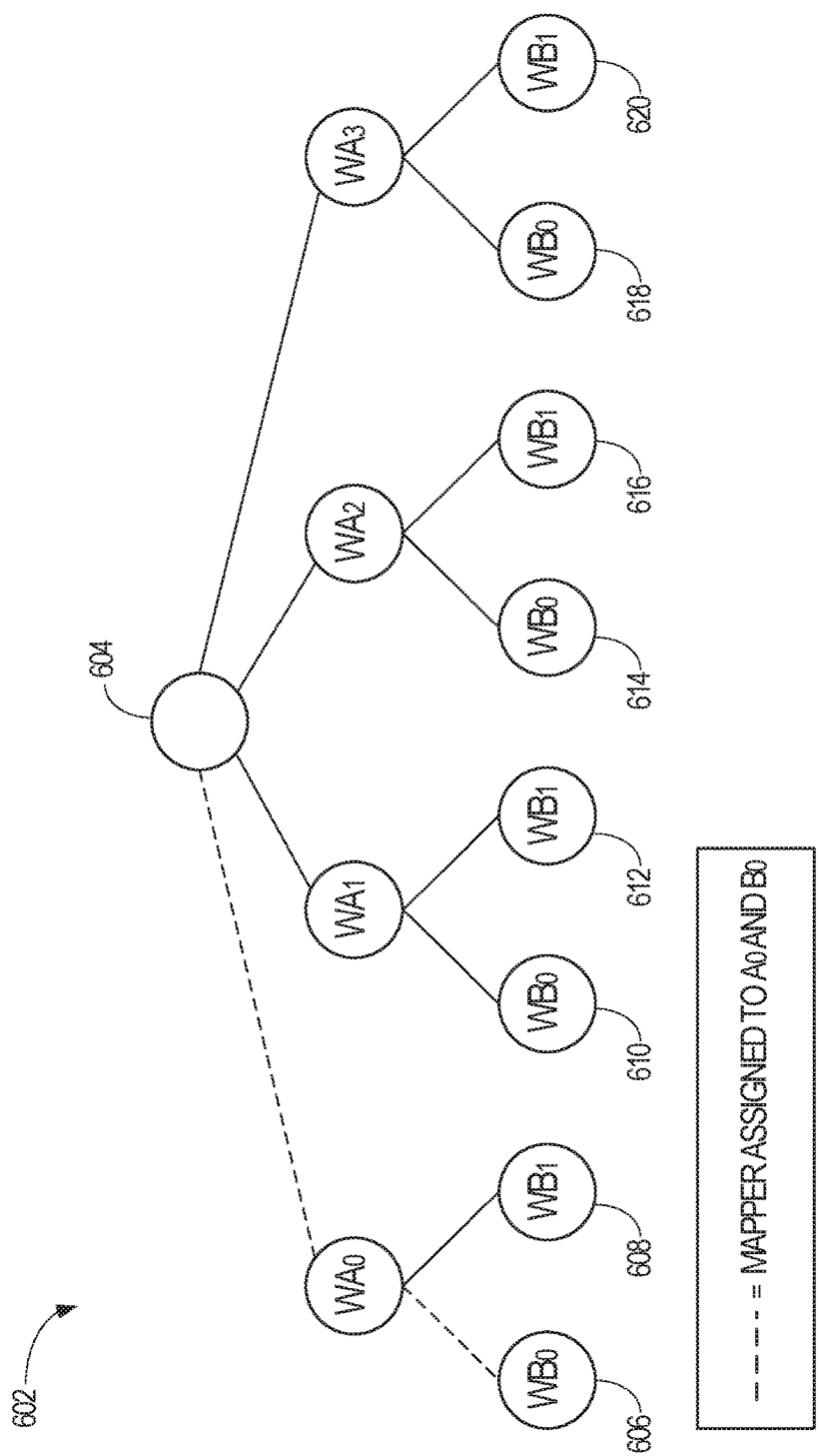
FIG. 6 is a block diagram illustrating a tree structure representing assigned mapping module processes, in accordance with an example embodiment.

To further illustrate the pairing of Work Units 230 and assigning such pairings to corresponding mapping module 222 processes, the assignment and pairing of Work Units may be represented as a tree structure. FIG. 6 is a block diagram illustrating a tree structure 602 representing assigning mapping module 222 processes, in accordance with an example embodiment. As illustrated in FIG. 6, suppose that the number of Work Units WA=4 (e.g., $WA_0$-$WA_3$) and that the number of Work Units WB=2 (e.g., $WB_0$ and $WB_1$). Thus, the pairing module 220 determines that the total number of mapping module 222 processes is eight. In this example, $WA_0$-$WA_3$ denote the Work Units 230 of graph G1 and $WB_0$ and $WB_1$ denote the Work Units of graph G2. Accordingly, the pairing module 220 proceeds to perform the Work Unit assignment in a tree-structured fashion as shown in FIG. 6.

In the tree structure 602, the first level represents the Work Units 230 of G1 and the second level represents the Work Units 230 of G2. Using this tree structure 602, the mapping module 222 processes the load corresponding to Work Units 230 of G1 and G2 that lie on the path from the root node 604 of the tree structure 602 to a given leaf node 606-620. As examples, a first mapping module 222 process is assigned the Work Units $WA_0$ and $WB_0$, a second mapping module 222 process is assigned the Work Units $WA_0$ and WB1, and a third mapping module 222 process is assigned the Work Units $WA_1$ and $WB_0$. Accordingly, in the embodiment illustrated in FIG. 6, the data processing engine 212 processes the Work Units 230 using a round-robin technique in a hierarchical fashion.

Figure 7:
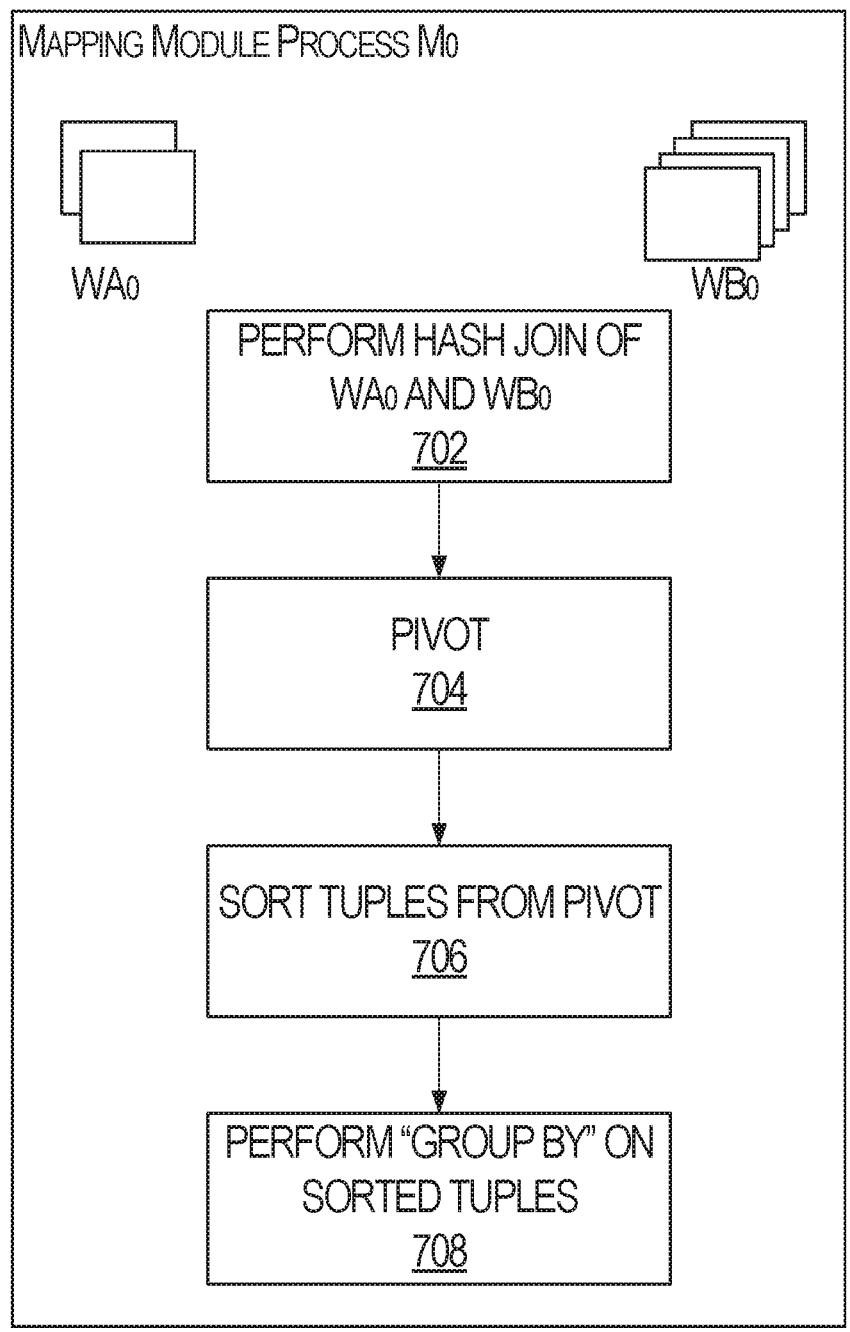
FIG. 7 is a block diagram illustrating example operations performed by a mapping module process of FIG. 6, in accordance with an example embodiment.

After the Work Units 230 are assigned to respective mapping module 222 processes, the mapping module 222 processes perform one or more operations to determine second-degree connections from the nodes of the graphs G1 and G2. FIG. 7 is a block diagram illustrating example operations performed by a mapping module process of FIG. 6, in accordance with an example embodiment. In the example shown in FIG. 7, a mapping module process $M_0$ is processing the Work Units $WA_0$ and the Work Units $WB_0$.

The mapping module process $M_0$ begins by loading the Work Unit $WA_0$ into memory. In this regard, the Work Unit $WA_0$ is smaller in size than the Work Unit $WB_0$. The mapping module process $M_0$ then streams through the physical partitions from the larger Work Unit $WB_0$ and iteratively joins every partition from the Work Unit $WB_0$ with the in-memory blocks from the G1 workunit (Operation 702). In this context, the term "streaming" refers to the fact that partitions of the Work Unit $WB_0$ may be stored in a memory that is a non-volatile memory, such as a hard disk, where the read and/or write operations performed on the memory are typically slower than other types of memory (e.g., volatile memory).

In one embodiment, the Work Unit $WB_0$ is loaded into memory and corresponds to the build side of a hash table. The mapping module process $M_0$ then performs the JOIN operation using an optimized version of the traditional HASH JOIN operation, which uses a memory efficient hash table to ensure that all of the records generated from the Work Unit $WB_0$ can be kept in memory. In one embodiment, the HASH JOIN is performed on the dest column (e.g., the column indicating the destination node) of the partitions from the Work Unit $WA_0$ and on the src column (e.g., the column indicating the source node) of the partitions from the Work Unit $WB_0$. In this embodiment, the output of the HASH JOIN corresponds to all possible paths between a source node from the Work Unit $WA_0$ and a destination node from the Work Unit $WB_0$ separated by two "hops." The intermediate node along each path is the shared connection. Since input records from the Work Unit $WA_0$ are fed to the HASH JOIN operator in order (e.g., sorted by the src column), the output of the HASH JOIN is guaranteed to be in sort order of the Work Unit $WA_0$, which is sorted by the G1.src node key. The HASH JOIN operation is implemented following the standard model of building a hash table from tuples coming from the right relation. Tuples from the left relation are streamed and probed from the hash table to extract all matching tuples from the right relation, and the join output tuple is constructed.

The mapping module process $M_O$ then performs a PIVOT operation (e.g., a "pivot in-memory") on the output from the HASH JOIN (Operation 704). This operation causes the mapping module process $M_O$ to buffer up output records for a given unique value of the G1.src column into memory. Thereafter, the mapping module process $M_O$ then performs a SORT operation on the output (Operation 706). This SORT operation causes the output tuples to be sorted on the second degree (e.g., the G2.dest node key). The mapping module process $M_O$ then engages a "GROUP BY" operation on the sorted tuples (Operation 708). The sorted tuples can now be fed to a group by operator (which requires its input to come in sorted order of the group by key as a precondition).

In an alternative embodiment, it is possible to avoid the sort and buffering step by using a hash aggregation with hash key as the G2.dest column, for a single pivoted block corresponding to a unique value of G1.src. The hash aggregation approach may use memory proportional to the number of unique G2.dest reachable from a given G1.src and is expected to have lower memory footprint.

The resulting output from the mapping module 222 processes can be used to determine count aggregation, which returns the total number of shared connections. In addition, the foregoing operations can be used to compute user-defined aggregations on the set of edge attributes along each path from the source to the second degree. In one embodiment, the resulting output may be stored as connection results 234, which the social networking server 112 may use in suggesting connections to members of the social networking service. For example, the foregoing techniques may be implemented to suggest second-degree connections to members who would otherwise be unware that they had a shared connection in common.

Figure 8:
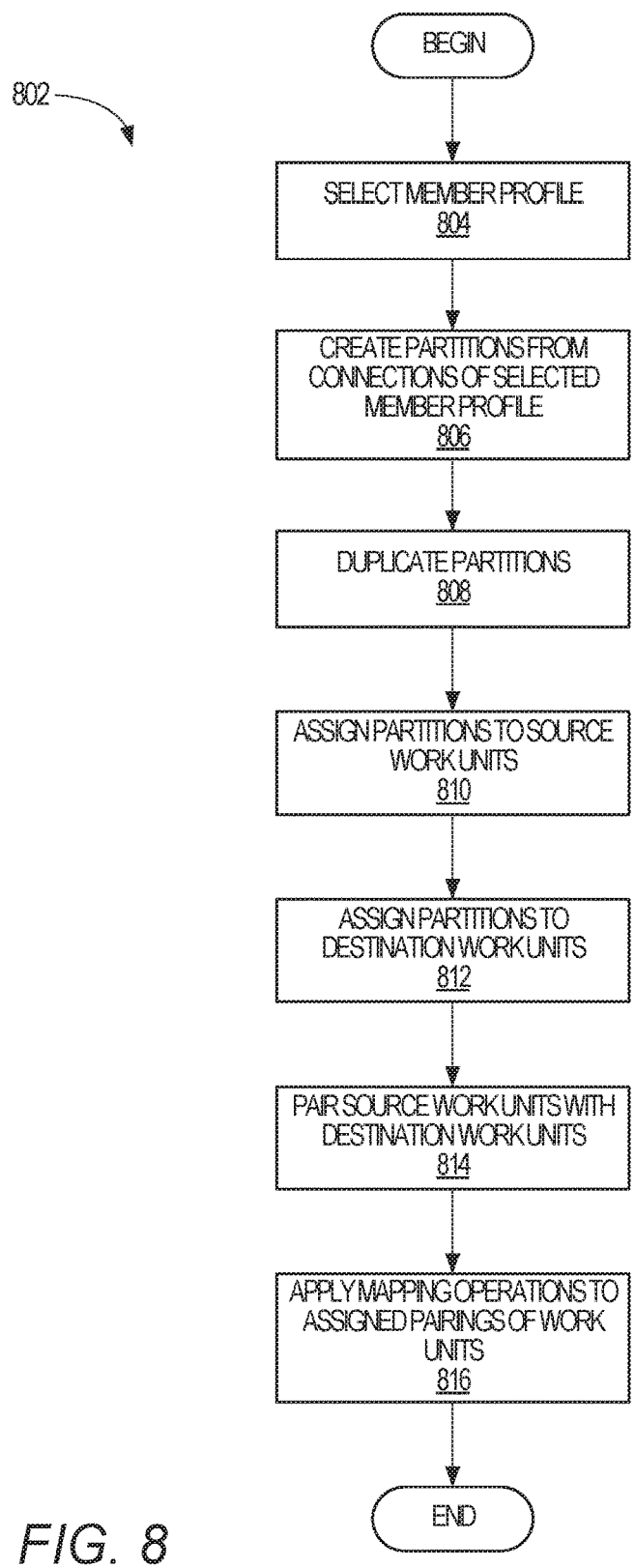
FIG. 8 illustrates a method, in accordance with an example embodiment, for determining second-degree connections of members within a social graph using the disclosed partitions, Work Units, and mapping module processes.

FIG. 8 illustrates a method 802, in accordance with an example embodiment, for determining second-degree connections of members within a social graph using the disclosed partitions, Work Units, and mapping module processes. The method 802 may be implemented by one or more components of the social networking server 112 and is discussed by way of reference thereto.

Initially, the social networking server 112 retrieves one or more member profile(s) 224 from the member profile database 120 (Operation 804). In addition, the social networking server 112 may retrieve one or more member graph(s) 226 corresponding to the retrieved one or more member profile(s) 224. The social networking server 112 then creates one or more partitions 228 from the retrieved member graph(s) 226 (Operation 806). As discussed previously, one or more of the partitions 228 may be constructed from a BLOCK-GEN primitive using the partitioning module 214.

Thereafter, the social networking server 112 duplicates the partitions 228 of the member graph (Operation 808). As explained above, the resulting partitions 228 may be assigned as a source graph G1, where the partitions are sorted by the G1.src column, and as a destination graph G2, where the partitions are sorted by the G2.dest column.

A Work Unit assignment module 218 then assigns the partitions of the G1 and G2 graph to respective Work Units 230 (Operations 810-812). In one embodiment, the assignment is asymmetrical, such that the Work Units for one graph (e.g., the source graph G1) are assigned fewer partitions 228 than the partitions assigned to Work Units for the other graph (e.g., the destination graph G2). The number of Work Units 230 per graph may be determined dynamically according to the amount of memory available to the social networking server 112, may be preconfigured beforehand, or a combination thereof.

The pairing module 220 then pairs the Work Units from the graph G1 with the Work Units from the graph G2, and assigns corresponding mapping module 222 processes accordingly (Operation 814). As discussed above with reference to FIG. 6, the pairing of the various Work Units may be performed in a round-robin fashion, such that each Work Unit from the source graph G1 is paired with every other Work Unit from the destination graph G2. In one embodiment, the assignments of Work Units and mapping module 222 processes are stored as the mapping assignments 232.

Each of the mapping module 222 processes then execute the mapping operations, discussed above with reference to FIG. 7, for their respective assigned Work Units (Operation 816). In one embodiment, such operations include loading the Work Units for a designated graph (e.g., the source graph G1) into memory and then streaming the Work Units for the other graph (e.g., the destination graph G2) as a HASH JOIN operation is performed on the partitions for each of the Work Units. After performing the operations as discussed in FIG. 7, the resulting output yields pairs of nodes that have a shared node (e.g., a shared member) in common. In one embodiment, the output from the foregoing operations 804-816 is stored as connection results 234, which the social networking server 112 may present, for a corresponding member, as second-degree members with whom the corresponding member may desire to connect or establish a relationship.

In this manner, this disclosure provides systems and methods that facilitate the efficient determination of second-degree connections for a social graph corresponding to a member of a social networking service. Unlike conventional implementations, the disclosed systems and methods leverage an asymmetrical approach to determining these second-degree connections such that portions of the data used by the systems and methods are loaded in-memory whereas other portions of the data are read in on a streaming basis. This approach has the technical benefit of efficiently using memory available to the system without exceeding the computing resources available. As social graphs can expand exponentially with the addition of each new node (e.g., a new member) or new edge (e.g., a new first-degree connection between nodes), being able to leverage the computing resources that are currently available in an efficient manner becomes increasingly important.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 9:
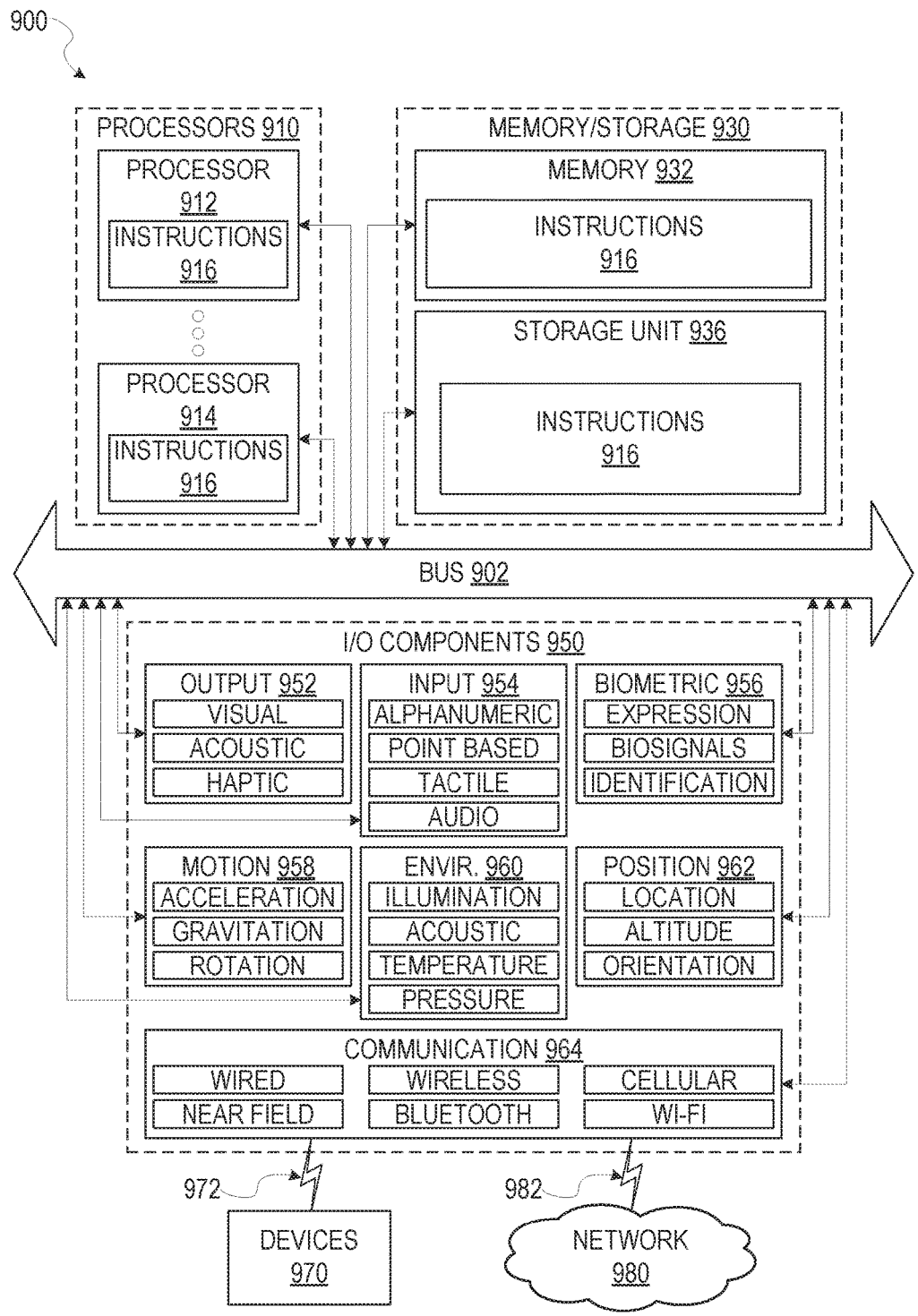
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically. FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the operations illustrated in FIGS. 3-8. Additionally, or alternatively, the instructions 916 may implement one or more of the components of FIGS. 1-2. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook a personal digital assistant (PDA), or any machine 900 capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 912 and processor 914 that may execute instructions 916. The term "processor" is intended to include multi-core processors 910 that may comprise two or more independent processors 910 (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor), multiple processors 910 with a single core, multiple processors 910 with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines 900 such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code. Data Matrix, Dataglyph, MaxiCode. PDF417. Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High Speed Packet Access (HSPA), Worldwide Interoperability for Microwave Access (WiMAX). Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a machine-readable medium storing computer-executable instructions; and
at least one hardware processor communicatively coupled to the machine-readable medium that, when the computer-executable instructions are executed, configures the system to:
retrieve a first social graph for a social networking service, the first social graph including a first plurality of nodes corresponding to members of the social networking service and a first plurality of edges connecting the first plurality of nodes, wherein each edge is established between a source node and a destination node and represents a connection between members of the social networking service;
duplicate the first social graph to obtain a second social graph that is a copy of the first social graph, the second social graph comprising a second plurality of nodes that is a copy of the first plurality of nodes;
partition the first plurality of nodes into a first plurality of partitions, the first plurality of partitions being determined according to a source node selected from the first plurality of nodes;
partition the second plurality of nodes into a second plurality of partitions, the second plurality of partitions being determined according to a destination node selected from the second plurality of nodes;
assign each of the first plurality of partitions to a work unit of a first plurality of work units, wherein the first plurality of work units are determined according to a constraint on computing resources;
assign each of the second plurality of partitions to a work unit of a second plurality of work units; and
determine a third plurality of nodes by joining at least one partition selected from the first plurality of work units with at least one partition selected from the second plurality of work units, wherein the determined third plurality of nodes identify at least one node representing a second-degree connection for a member of the social networking service.

2. The system of claim 1, wherein a number of partitions assigned to a work unit selected from the first plurality of work units is less than the number of partitions assigned to a work unit selected from the second plurality of work units.

3. The system of claim 1, wherein each of the first plurality of work units is assigned a unique set of partitions selected from the first plurality of partitions.

4. The system of claim 1, wherein each of the second plurality of work units is assigned a unique set of partitions selected from the second plurality of partitions.

5. The system of claim 1, wherein a work unit selected from the first plurality of work units is entirely loaded into a volatile memory of the system and a paired work unit from the second plurality of work units is streamed into the volatile memory for determining the third plurality of nodes.

6. The system of claim 1, wherein the determination of the third plurality of nodes includes performing a hash join operation with the partitions assigned to a first work unit selected from the first plurality of work units and the partitions assigned to a second work unit selected from the second plurality of work units.

7. The system of claim 1, wherein the constraint on computing resources is an amount of available volatile memory.

8. A method comprising:
retrieving, by at least one hardware processor, a first social graph for a social networking service, the first social graph including a first plurality of nodes corresponding to members of the social networking service and a first plurality of edges connecting the first plurality of nodes, wherein each edge is established between a source node and a destination node and represents a connection between members of the social networking service;
duplicating the first social graph to obtain a second social graph that is a copy of the first social graph, the second social graph comprising a second plurality of nodes that is a copy of the first plurality of nodes;
partitioning, by at least one hardware processor, the first plurality of nodes into a first plurality of partitions, the first plurality of partitions being determined according to a source node selected from the first plurality of nodes;
partitioning, by at least one hardware processor, the second plurality of nodes into a second plurality of partitions, the second plurality of partitions being determined according to a destination node selected from the second plurality of nodes;
assigning, by at least one hardware processor, each of the first plurality of partitions to a work unit of a first plurality of work units, wherein the first plurality of work units are determined according to a constraint on computing resources;
assigning, by at least one hardware processor, each of the second plurality of partitions to a work unit of a second plurality of work units; and
determining, by at least one hardware processor, a third plurality of nodes by joining at least one partition selected from the first plurality of work units with at least one partition selected from the second plurality of work units, wherein the determined third plurality of nodes identify at least one node representing a second-degree connection for a member of the social networking service.

9. The method of claim 8, wherein a number of partitions assigned to a work unit selected from the first plurality of work units is less than the number of partitions assigned to a work unit selected from the second plurality of work units.

10. The method of claim 8, wherein each of the first plurality of work units is assigned a unique set of partitions selected from the first plurality of partitions.

11. The method of claim 8, wherein each of the second plurality of work units is assigned a unique set of partitions selected from the second plurality of partitions.

12. The method of claim 8, wherein a work unit selected from the first plurality of work units is entirely loaded into a volatile memory of the system and a paired work unit from the second plurality of work units is streamed into the volatile memory for determining the third plurality of nodes.

13. The method of claim 8, wherein the determination of the third plurality of nodes includes performing a hash join operation with the partitions assigned to a first work unit selected from the first plurality of work units and the partitions assigned to a second work unit selected from the second plurality of work units.

14. The method of claim 8, wherein the constraint on computing resources is an amount of available volatile memory.

15. A non-transitory machine-readable medium storing computer-executable instructions that, when executed by at least one hardware processor, causes a system to perform a plurality of operations, the plurality of operations comprising:

retrieving a first social graph for a social networking service, the first social graph including a first plurality of nodes corresponding to members of the social networking service and a first plurality of edges connecting the first plurality of nodes, wherein each edge is established between a source node and a destination node and represents a connection between members of the social networking service;

duplicating the first social graph to obtain a second social graph that is a copy of the first social graph, the second social graph comprising a second plurality of nodes that is a copy of the first plurality of nodes;

partitioning the first plurality of nodes into a first plurality of partitions, the first plurality of partitions being determined according to a source node selected from the first plurality of nodes;

partitioning the second plurality of nodes into a second plurality of partitions, the second plurality of partitions being determined according to a destination node selected from the second plurality of nodes;

assigning each of the first plurality of partitions to a work unit of a first plurality of work units, wherein the first plurality of work units are determined according to a constraint on computing resources;

assigning each of the second plurality of partitions to a work unit of a second plurality of work units; and determining a third plurality of nodes by joining at least one partition selected from the first plurality of work units with at least one partition selected from the second plurality of work units, wherein the determined third plurality of nodes identify at least one node representing a second-degree connection for a member of the social networking service.

16. The non-transitory machine-readable medium of claim 15, wherein a number of partitions assigned to a work unit selected from the first plurality of work units is less than the number of partitions assigned to a work unit selected from the second plurality of work units.

17. The non-transitory machine-readable medium of claim 15, wherein each of the first plurality of work units is assigned a unique set of partitions selected from the first plurality of partitions.

18. The non-transitory machine-readable medium of claim 15, wherein a work unit selected from the first plurality of work units is entirely loaded into a volatile memory of the system and a paired work unit from the second plurality of work units is streamed into the volatile memory for determining the third plurality of nodes.

19. The non-transitory machine-readable medium of claim 15, wherein the determination of the third plurality of nodes includes performing a hash join operation with the partitions assigned to a first work unit selected from the first plurality of work units and the partitions assigned to a second work unit selected from the second plurality of work units.

20. The non-transitory machine-readable medium of claim 15, wherein the constraint on computing resources is an amount of available volatile memory.

* * * * *

UNITED STATES PATENT AND TRADEMARK OFFICE
CERTIFICATE OF CORRECTION

PATENT NO. : 10,191,948 B2  
APPLICATION NO. : 15/056996  
DATED : January 29, 2019  
INVENTOR(S) : Vemuri et al.

Page 1 of 1

It is certified that error appears in the above-identified patent and that said Letters Patent is hereby corrected as shown below:

In the Claims

In Column 23, Lines 22-23, in Claim 15, delete "scicctcd" and insert --selected-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*